(No Model.)
O. F. A. FAULKNER.
FENCE POST.
No. 443,848. Patented Dec. 30, 1890.
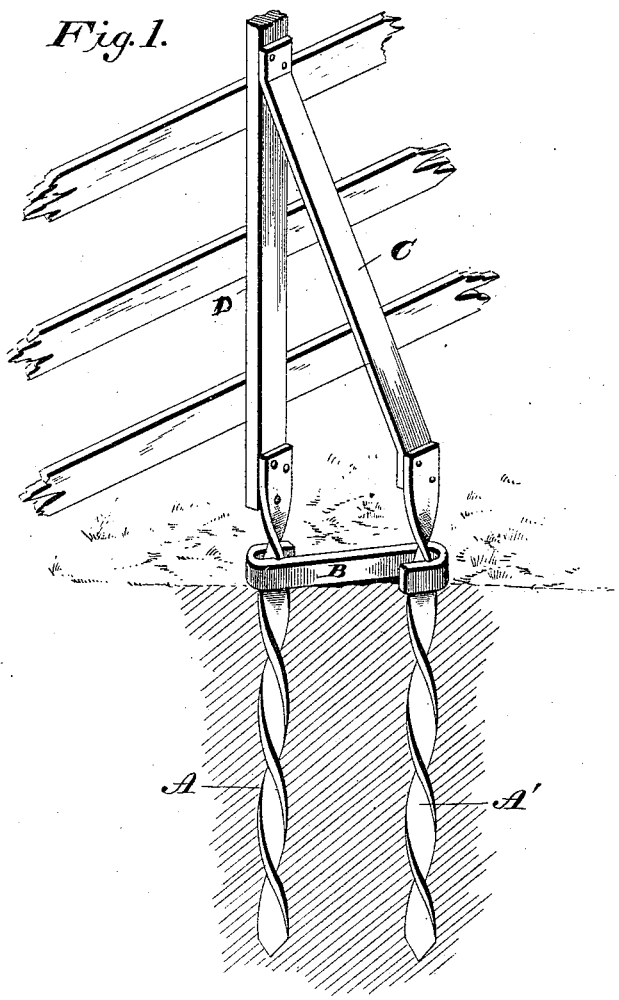
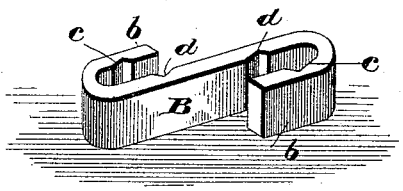
Witnesses
G. S. Elliott
E. W. Johnson
Oscar F. A. Faulkner.
Inventor
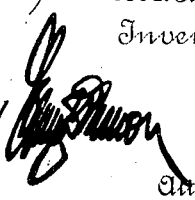
by
Attorney

UNITED STATES PATENT OFFICE.

OSCAR F. A. FAULKNER, OF MOUNT PLEASANT, IOWA.

FENCE-POST.

SPECIFICATION forming part of Letters Patent No. 443,848, dated December 30, 1890.

Application filed September 11, 1890. Serial No. 364,599. (No model.)

*To all whom it may concern:*

Be it known that I, OSCAR F. A. FAULKNER, a citizen of the United States of America, residing at Mount Pleasant, in the county of Henry and State of Iowa, have invented certain new and useful Improvements in Fence-Posts; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in fence-posts.

The object of the invention is to provide a simple, cheap, and effective base or fence-post, to which the upper sections of the post can be secured; and it consists in the employment of two spiral base-pieces and a connecting link or bar, through which the same pass, as will be hereinafter fully set forth, and particularly pointed out in the claims.

In the accompanying drawings, forming part of this specification, Figure 1 is a perspective view showing a fence-post constructed in accordance with my invention. Fig. 2 is a detal view of a modification. Fig. 3 is a perspective view of the link.

A and A' refer to the base-sections of the post, which are made up of flat bars of metal, which are twisted or bent in the form of a spiral, the lower ends being pointed, while the upper ends are provided with perforations, to which the upper sections of the post can be secured.

B refers to a connecting bar or link, the ends of which are bent in opposite directions, as shown, to provide end portions $b\,b$, which lie parallel with the central portion. These end portions are provided with V-shaped recesses $c\,c$, and nearly opposite thereto the central portion is provided on opposite sides with corresponding recesses or notches $d$.

When it is desired to bury the post-sections A and A', the link or connecting-bar is laid upon the ground and the ends of the metallic base-sections are placed in the notches $c$ and $d$, and by the employment of a maul said sections are driven into the ground. The edges thereof engaging with the notches hereinbefore described cause the said sections to turn as they are driven into the ground, the post D and brace being first removed from the sections A and A', and after said sections have been driven into the ground for a sufficient depth the post and brace are rebolted to the post-sections, so as to be maintained in a vertical position. If desirable, the section A may extend upward for a sufficient length to attach the fence-wires thereto.

From the metallic section A' extends a brace C, which is secured at its upper end to the vertical post D in any suitable manner.

A fence-post made as hereinbefore described, can be cheaply constructed and is easily placed in position, and should it be desired to remove the same it can be done by simply detaching the brace C and vertical post from the base sections. The base-sections can also be inserted by simply turning the same. The brace or connecting-bar B having the notches not only serves to brace the upper portions of the base-sections, but also maintains them at the proper distance from each other and serves as a guide, which causes the sections to turn as they enter the ground.

Having thus described my invention, what I claim as new, and desire to secure by Letters Patent, is—

1. In a fence-post, the combination of the spiral base-sections, a connecting-bar B, having notches or grooves, within which the edges of the base-sections lie, one of said spiral sections carrying an upright and the other a brace C, substantially as set forth.

2. In combination with the spiral base-sections A and A', a bar B, having bent ends and notches $c$ and $d$, substantially as set forth.

3. The combination, in a fence-post, of a vertical post, inclined base extending downwardly therefrom, said post and brace being attached at their lower ends to the spiral base-sections A and A', and a connecting-bar B, the central portion having notches $d\,d$, the ends of the same being bent in opposite directions to lie parallel with the central portion, the inner edges thereof having notches $c\,c$, substantially as set forth.

In testimony whereof I affix my signature in presence of two witnesses.

OSCAR F. A. FAULKNER.

Witnesses:
 ANDREW GOAN,
 WILLIAM HELTON.